United States Patent [19]
Johnson

[11] 4,085,983
[45] Apr. 25, 1978

[54] SWIVEL THRUST BEARING

[75] Inventor: Carl B. Johnson, Pontiac, Ill.

[73] Assignee: Pontiac Furniture Industries, Inc., Pontiac, Ill.

[21] Appl. No.: 683,901

[22] Filed: May 6, 1976

[51] Int. Cl.² ..................... F16C 11/00; F16C 27/06
[52] U.S. Cl. .......................... 308/134.1; 248/425; 16/20; 308/238; 403/164
[58] Field of Search ............. 308/72, 165, 134.1, 308/174, 227, 229; 403/164, 165, 78; 16/20, 21, 22, 23, 27, 28; 248/415, 349, 425

[56] References Cited
U.S. PATENT DOCUMENTS

| 2,193,713 | 3/1940 | Cole | 308/134.1 |
| 2,529,780 | 11/1950 | Miller | 248/415 |
| 2,938,755 | 5/1960 | Lee et al. | 308/72 |
| 3,231,926 | 1/1966 | Stollman | 16/22 |
| 3,243,239 | 3/1966 | Hackman | 308/72 |
| 3,837,039 | 9/1974 | Rehrig | 16/20 |

Primary Examiner—Richard A. Bertsch
Attorney, Agent, or Firm—Fitch, Even, Tabin & Luedeka

[57] ABSTRACT

A "centerless" swivel bearing for chairs and the like in which the two facing, relatively rotatable members are each in sliding contact with an interposed lubricating liner on a ring of substantial diameter defining a central opening in the bearing. One of the two members is necked through the opening of the other and then turned radially outwardly to maintain the assembly of the three constituent parts against loading tending to separate the two members.

6 Claims, 10 Drawing Figures

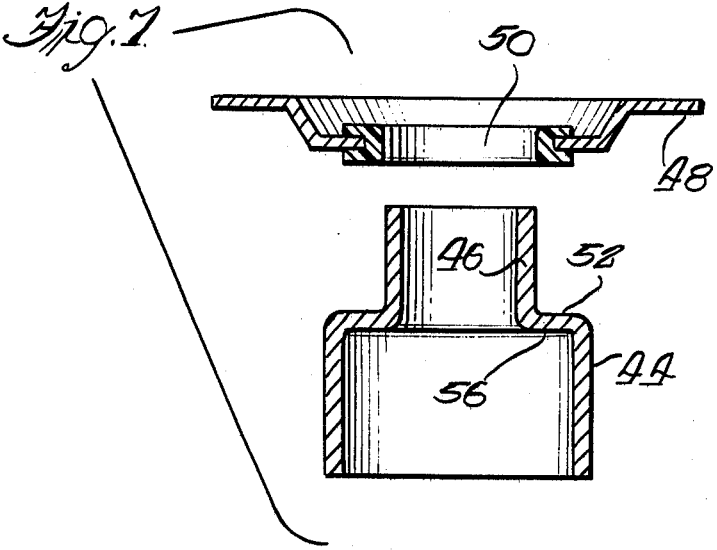
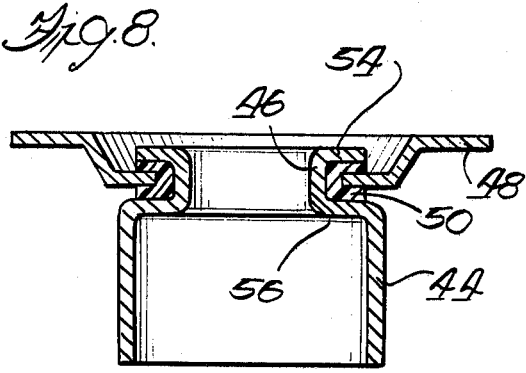
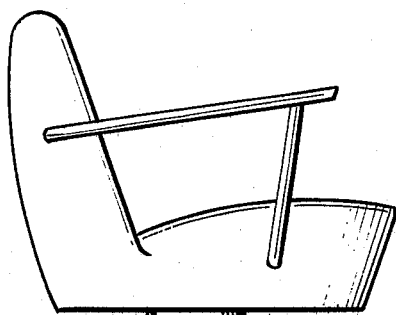
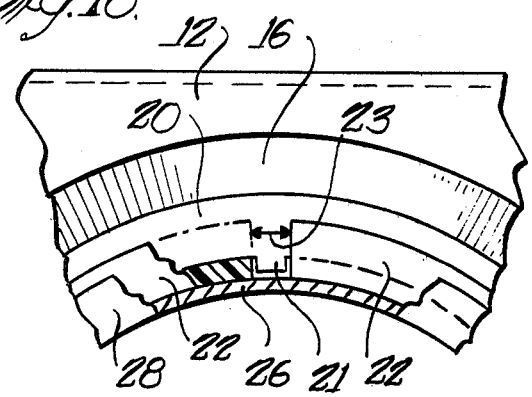
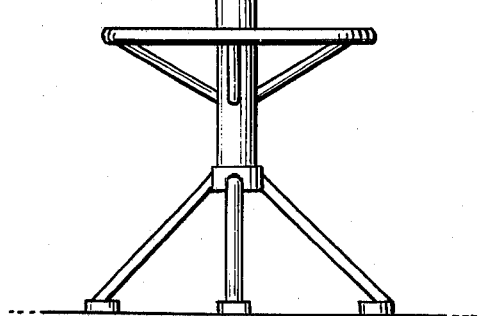

SWIVEL THRUST BEARING

This invention relates to swivel thrust bearings for chairs, seats, and the like, in which, from the nature of the application, the bearing may be loaded unequally, and even in opposite axial directions at the same time, as by off-center distribution of the static load of the weight of the occupant, and by the dynamic loading of such bearings in swivel rocking chairs.

Many thrust bearings intended for use in swivel chairs employ a pair of facing plates designed to be attached respectively to the two relatively rotatable portions of the chair, with some form of anti-friction device between them, frequently a ball race, and a central pivot bolt or axle to maintain the assembly of the several bearing parts.

The bearing of this invention, in contrast, is "centerless", i.e., without the usual central pivot to serve as the axis of rotation of the relatively rotatable thrust plates, and, in the process, eliminating the central pivot as a load-resisting member. The elimination of the central pivot doubles the effective radius arm of the couple which resists rocking or off-center loadings, reducing by one-half the force tending to separate the bearing members themselves. The concurrent elimination of load on the bearing members at the center of rotation also permits a greater flexibility of design, and lighter construction, while the reduction of the unit loading of the bearing under the same external loads permits the use of relatively inexpensive sliding contact liner materials in place of expensive anti-friction rolling devices between the relatively rotatable bearing members.

The invention and its attainment of the foregoing objectives will be understood from the following description taken in conjunction with the accompanying drawings, in which:

FIG. 7 is an axial sectional elevation of a further modification, particularly adaptable to seating of the pedestaltype, such as counter stools;

FIG. 8 is a sectional elevation similar to FIG. 7 showing the bearing after assembly; and FIG. 9 is an illustration of the application for which the second modified form is intended, viz., an elevated pedestal stool.

FIG. 10 is a fragmentary sectional view of the thrust bearing of the invention showing the optional locking of the liner, in extruded split ring form, for rotation with a selected one of the two bearing members.

In contrast to swivel bearings, or so-called "chair irons", now in use in the manufacture of swivel chairs, particularly swivel rockers of the type sold for use in the home, the bearing of the present invention is "centerless", i.e., it does not have the usual pivot bolt or rivet to maintain the assembly of the two relatively rotatable bearing parts which are attached to the base and movable body of the chair respectively. It is also double-acting, i.e., capable equally of resisting loads between the bearing members in opposite axial directions.

It will readily be recognized that a load which is off-center relative to the pivot axis of the bearing exerts its heaviest compressive load between the two bearing plates on the side of the eccentric load, while the resulting couple can result in a tensile load seeking to separate the two plates on the opposite side of the bearing, particularly in a swivel rocking chair. In a bearing with a center bolt or pivot, the necessary resistive couple or torque required to maintain the assembly of the bearing is provided by the relatively short torque arm between the pivot center and a circumferential segment of the bearing adjacent to the eccentric load. The bearing of the present invention, by eliminating the center pivot and providing for the absorption of thrust in both axial directions in all portions of the bearing, doubles the effective torque arm under the same off-center or torsional loading conditions, and makes possible a broader distribution of the off-center load throughout the bearing with consequent reduction of unit loading under these strenuous conditions.

Figure 1:
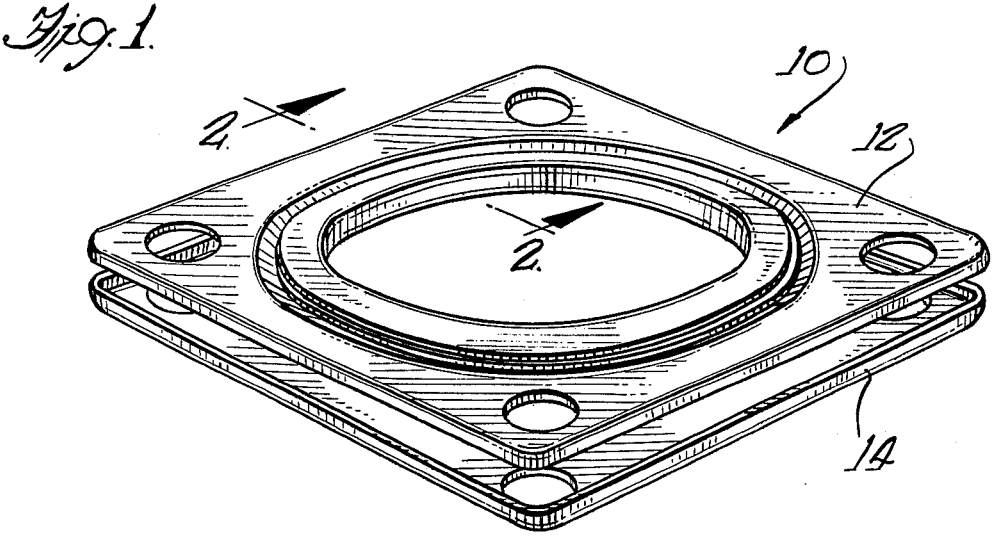
FIG. 1 is an isometric rendering of the swivel bearing of the invention in a particular form adapted for use as the swivel bearing of a chair.
Figure 2:
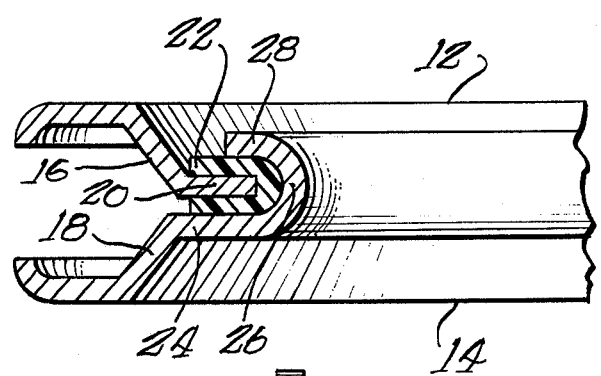
FIG. 2 is a fragmentary sectional view of the bearing of FIG. 1, taken along the line 2—2 of FIG. 1.
Figure 3:
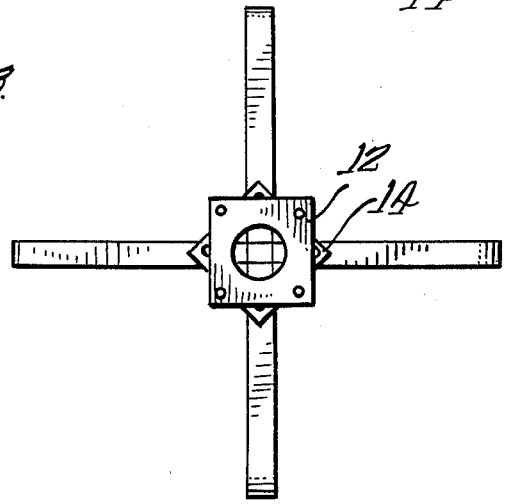
FIGS. 3 and 4 are respectively plan and elevational view of an application of the bearing of the invention in the furniture context.
Figure 4:
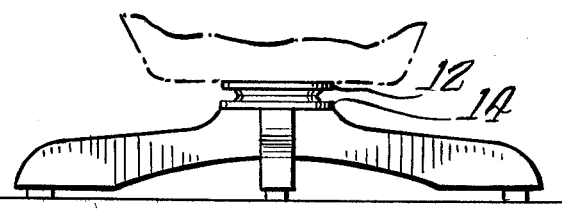

Referring to FIGS. 1 and 2, a preferred form of the swivel bearing 10 of the invention incorporating the above-mentioned characteristics is fabricated of metal stampings. A convenient overall form for furniture application contemplates opposed bearing members 12 and 14 in the form of square plates, each having a conical central boss 16 and 18, respectively. The dimensional relief provided by the conical embossments facilitates the mounting of the bearing for movement of its relatively movable parts without interference with the chair member to which the plate is attached, and, by increasing the depth of the plate, greatly rigidifies and strengthens the plate for the support of the active bearing surfaces of this double-acting thrust bearing.

At its smaller diameter, the boss 16 of the upper member 12 has an inwardly extending flange 20 which provides a flat ring with opposed annular bearing surfaces and a concentric circular inner periphery.

Embracing the inwardly-extending flange 20 is a bearing liner which is itself in the form of a ring 22 having an outwardly-open, U-shaped cross section so as to separate the inner ring from the cooperating bearing member, still to be described, in both axial directions, and radially as well.

The cooperating lower bearing member 14, in the form illustrated in FIGS. 1 and 2, is similar in general outline to the upper bearing member 12 and also has at the smaller diameter of its conical central embossment an inwardly-extending peripheral flange 24. However, the inwardly-extending flange 24 is provided with an interior neck portion 26, which, after insertion through the central aperture in the flange 20 of the upper bearing member and the interposed liner 22, is curled outwardly to form a ledge 28 extending over the opposite side of the liner. The ledge 28 maintains the assembly of the bearing parts, and also provides a second annular bearing surface to permit the transmission of thrust in both axial directions between the two relatively rotatable bearing parts, and in any circumferential segment of the bearing. Similarly, the neck portion of the lower bearing member provides a radial bearing surface in opposition to the inner periphery of the ring flange 20 of the upper member.

Both the upper and lower bearing members 12 and 14 may be formed from fourteen (14) gauge mild steel, preferably of aluminum-killed, drawing quality. A suitable liner may be molded of duPont's "Delrin 100", an acetal resin polymer formaldehyde, impregnated with one-third of one percent by weight of molybdenum disulfide, but other liner materials may be used. The liner may take the form of a split ring extrusion, or if desired to facilitate assembly, of facing molded rings.

To further enhance the life of the bearing, I prefer to lock the bearing liner to the ring flange 20 of the upper bearing member so as to limit the relative rotation of parts to that between the lower member and the liner. This can conveniently be done by providing a locking tang 21 on the interior periphery of the ring flange 20 of the upper member so as to be closely received in a space 23 between the ends of the extended, split-ring form of liner, as in FIG. 10, or in cooperating notches in the mating molded ring form of liner.

As earlier indicated, the center of the bearing is open and clear. Any torsional load experienced by the bearing, as for example by the rearward tilting of the chair, is resisted by the entire bearing, which may in many cases result not only in a downward loading on one side of the bearing, tending to move the mounting plates of the two bearing members closer together, but also in a tensile loading on the opposite side, i.e., a loading tending to separate the bearing members on the opposite side of the bearing. In these circumstances, and without the intervention of a central pivot bolt, the "centerless" effect or, to be precise, the manifold enlargement of the central pivot into the form of the neck portion of the inserted bearing member, has two important results, viz., the radius arm of the resistive torque is doubled and the loading on the active bearing members is more widely distributed, with resulting lower unit loading.

The form of FIGS. 1 and 2 contemplates that the inserted neck portion 26 of the bearing plate which is illustrated as, and for convenience referred to as, the "lower" bearing member, is curled about the bearing liner 22 throughout the entire 360° of its periphery. Because the tensile load making for separation of the bearing plates is usually of lesser magnitude than the compressive load, the overlying ledge portion 28 in the full 360° curl contemplated in FIGS. 1 and 2 need not provide the same amount of surface area contact as is provided for compressive load, and FIG. 2 illustrates the curl or ledge portion 28 of the inserted neck 26 as being of lesser radial extent than the opposed flanges 22 and 24.

Figure 5:
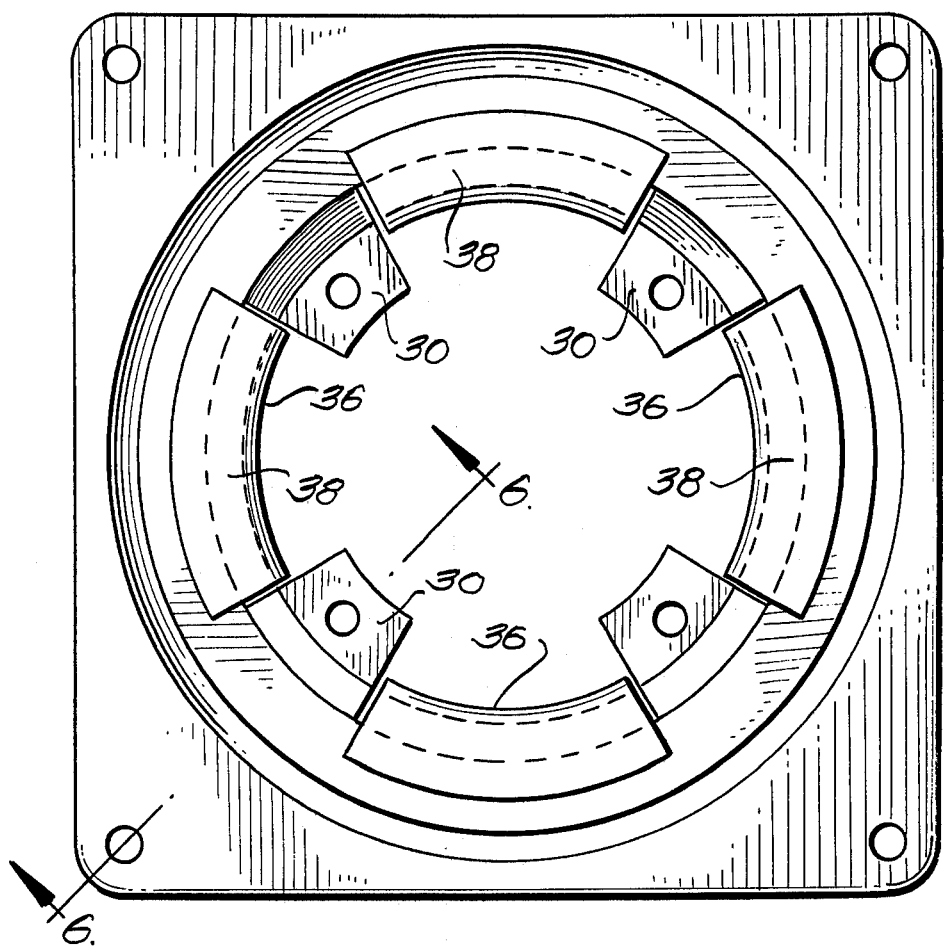
FIG. 5 is a plan view of a slightly modified form of the bearing of FIGS. 1 and 2.
Figure 6:
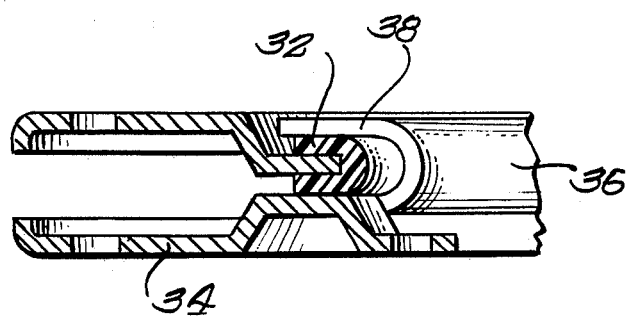
FIG. 6 is a fragmentary sectional view of the modified form taken along the line 6—6 of FIG. 5.

By the same token, the lesser requirement to secure the bearing members together against separation suggests the first modified form of FIGS. 5 and 6, in which, in the forming process, a number of additional and auxiliarly mouting tabs 30 is provided in the lower plate member 34 in the plane of the outwardly-extending mounting flange, but extending inwardly toward the open center of the bearing. In this modified form, the entering or neck portion 36 of the lower bearing plate is correspondingly divided into separated segments 38 which are then curled over the liner 32 to provide the ledges overlying the upper bearing member to prevent separation of the bearing members under torsional or tilting load.

In the further modification of FIGS. 7 to 9, inclusive, the lower bearing member 44 is a short tubular or cup-shaped socket which is necked down at one end 46 for insertion into the aperture of the upper plate member 48 and liner 50, and to provide a circumferential annular bearing surface 52 for engagement with the under-surface of the liner. When the neck 46 is inserted into the upper plae, the inserted end is likewise curled over the liner 50 to provide a retaining ledge 54 for maintaining the assembly and for resisting the torsional loads tending to separate the two parts of the bearing. The wall of the socket which provides the annular lower bearing surface also provides, internally of the tube, a seat or limiting stop 56 for the insertion of the upper end of the pedestal on which it is mounted.

The construction as illustrated and described, by the elimination of the center pivot, and more effective utilization of the available performance of the materials which it permits, reduces considerably the cost of material and construction, while at the same time permitting greater flexibility of design.

The features of the invention believed patentable are set forth in the following claims:

What is claimed is:

1. A thrust bearing comprising a flat ring member, a lubricating liner embracing the inner periphery of said ring member and both sides thereof adjacent to said inner periphery, and a second member having an annular surface in contact with said liner in facing relation to one side of said ring member, said second member having an integral neck portion extending through the central apertures of said ring member and liner and having integral ledge means extending radially outwardly from said neck portion in contact with the liner on the opposite side of said ring member, said annular surface and ledge means enabling said second member to receive or transmit thrust in either axial direction from or to said ring member through the interposed liner, said integral outwardly-extending ledge means constituting the sole means of maintaining the assembly of said ring member, interposed liner, and second member.

2. The bearing of claim 1 in which the flat ring member is the inwardly extending peripheral flange of a boss formed in a plate.

3. The bearing of claim 2 in which said one side of the ring member is on the outside of the boss, the second member is formed of a second plate, said neck portion is provided by a tubular protrusion from one side of said second plate, said annular surface is provided by the surface of the plate surrounding said tubular protrusion, and said ledge means is formed by the outward curl of the end of the protrusion which extends through the central aperture of the ring member.

4. The bearing of claim 3 in which the annular surface of the second member is also on the outside of a boss formed in the second plate in opposing relation to the boss of the first-mentioned plate.

5. The bearing of claim 2, in which said one side of the ring member is on the outside of the boss, the second member is formed of a second plate, said annular surface is the outside of a boss formed in the second plate in opposing relation to the boss in the first-mentioned plate, said neck portion is provided by separate tabs protruding in cylindrical array from the inner edge of said annular surface, and said ledge means is formed by the outward curl of the ends of said tabs.

6. The bearing of claim 2 in which the second member is tubular and necked down at one end to provide said annular surface as well as said neck portion, and said ledge means is formed by the outward curl of the neck of the tube, and the tube wall which provides said annular surface also serves as a limiting stop for the insertion of a pedestal top.

* * * * *